Patented Jan. 16, 1951

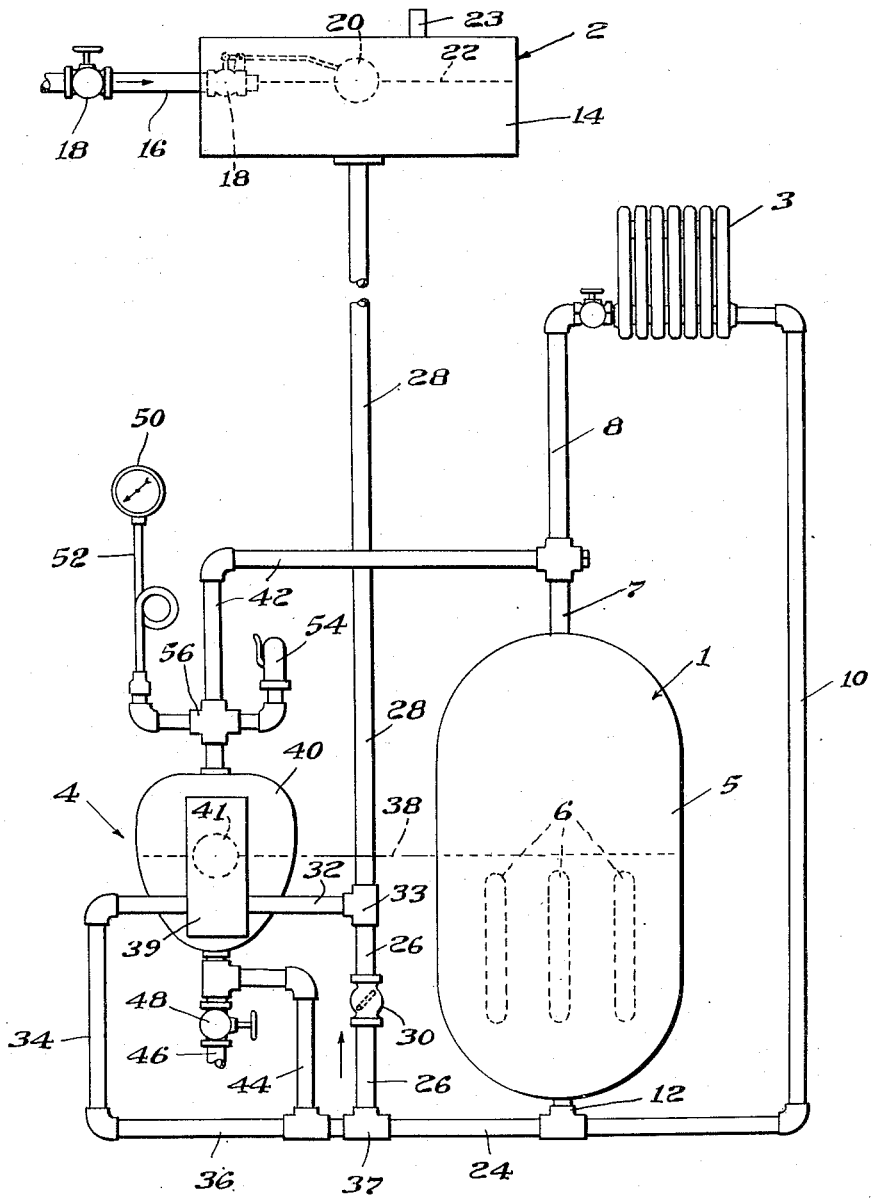

2,538,648

UNITED STATES PATENT OFFICE 2,538,648

IMMERSED ELECTRODE STEAM GENERATOR

Stanley Livingstone, Natick, Mass., assignor to Livingstone Engineering Company, Worcester, Mass., a corporation of Massachusetts Application January 6, 1949, Serial No. 69,449

8 Claims. (Cl. 219—40)

The present invention relates to steam generators and more particularly to electrical steam generators of the immersed electrode type.

The immersed electrode steam generator is a convenient small capacity source of steam, particularly for installations in which each of a number of separate steam consuming units is to be supplied with its own independent steam supply. Such generators also are coming into use for domestic heating in areas in which the cost of electrical energy makes such use economic.

Such steam generating units, however, have suffered from the disadvantage that the pressure and temperature of the supplied steam were not so regulated and maintained within a narrow range as to make the units efficient and economically feasible.

The present invention has as an object to provide an efficient immersed-electrode steam generator which is simple in structure and reliable in operation and which is capable of supplying steam at a varying rate and at a closely regulated pressure and temperature.

In accordance with the invention my generator comprises a steam generation chamber containing electrodes immersed in an electrolyte for the generation of steam. The liquid within the generation chamber is in hydraulic communication with liquid in an overhead reservoir at such an elevation above the generation chamber as to provide a hydrostatic head which corresponds to the steam pressure desired to be maintained during steaming operation of the generator. The free surface of the liquid in the reservoir is exposed to atmospheric pressure. The connections between the reservoir and the generation chamber are arranged to permit free flow of liquid from the chamber into the reservoir, and to permit flow of water from the reservoir into the chamber, up to a predetermined maximum level in the chamber, whenever the steam pressure in the chamber falls below the hydrostatic pressure provided by the reservoir.

My invention contemplates connection of the reservoir to the generator through two independent conduits, one of which permits liquid to flow from the generation chamber into the reservoir, but not in the opposite direction, and the other of which is arranged to permit flow of liquid into the generation chamber up to a predetermined maximum level and to prevent flow into the chamber when the generator liquid level reaches this maximum level. Means also is provided for supplying water to the reservoir from the water mains, whenever the level in the reservoir falls below a predetermined level. This arrangement thus continuously maintains the liquid in the generator under a hydrostatic pressure corresponding to the water level in the reservoir without flooding the generator with water, and automatically feeds make-up water to the generator from the reservoir as may be required.

The electrodes are so located in the generation chamber that when the water level in the chamber rises with any decrease of steam pressure, more of the surface area of the electrodes is covered with water, increasing the current flow between them and thus increasing the heat supplied and tending to raise the steam pressure. Conversely, when the water level falls, the immersed area of the electrodes is decreased, lowering the steam pressure. Variation of the liquid level in the chamber with deviations of the steam pressure from the desired pressure thus continuously regulates the current flow through the electrodes and so controls the rate of heat supply. Automatic and continuous close regulation of the steam pressure is thus maintained solely by simple hydraulic means, without the use of throttling or regulating valves or other mechanical arrangements.

The immersed electrode steam generator of my invention is adapted to wide application, for example for supplying steam to plastic moulding presses, tire recapping units, clothes pressing units, and other industrial or domestic steam operated devices. The generator also is applicable to domestic and industrial heating systems and for the purpose of illustration will be further described herein by reference to a domestic heating unit, without intention thereby to restrict the invention to this application.

An illustrative embodiment of the invention in a domestic heating system is shown in the accompanying drawing wherein the single figure is a schematic elevational view showing the relation of the essential parts comprising my generator.

Referring to the drawing, the generator comprises a steam generation chamber 1, a liquid reservoir 2 disposed above chamber 1, a steam consuming unit 3 (a steam radiator in this instance), and equipment indicated generally at 4 for regulating the flow of liquid between the reservoir 2 and the chamber 1.

Steam generation chamber 1 is formed from an outer shell 5, of suitable riveted or welded pressure tank construction, containing a series of spaced electrodes 6 in the lower part, or water space, of the chamber. Electrodes 6 are connected by suitable lead-in connections (not shown) to a power supply main. Conveniently, three electrodes may be employed and each of the electrodes may be connected to one phase of a 3-phase power supply. The electrode lead-ins are suitably insulated from shell 5, and shell 5 in turn is electrically isolated from the remainder of the generator. The tank 5 is of a size and shape such as to provide a vapor space above the liquid therein when the electrodes are fully immersed.

A main steam discharge line 7 rises from the upper head of shell 5 and may be connected through a riser 8 to the radiator 3. A condensate return line 10 from the radiator leads to the bottom of shell 5 through a connection 12.

The reservoir 2 comprises a suitable wooden, metallic or vitreous ware tank 14 appropriately supported at the desired elevation above the steam generation chamber 1. In a domestic heating installation this elevation may be about twelve feet. Water is supplied to the tank 14 through a pipe 16 connected to the water mains through a shut-off valve 18.

Discharge of liquid from line 16 into tank 14 is under the control of a float valve 18 of a conventional type having a float ball 20. The valve 18 is closed when ball 20 is raised by rise of water in the tank 14 above a predetermined level 22 and is open when the liquid level in the tank is below this level 22. The valve 18 and float 20 are so located within the tank 14 that the level 22 is below the top of the tank to permit the tank to accommodate liquid forced from the generation chamber by an increase of pressure of steam in the vapor space thereof. The top of tank 14 may be left open or provided with a suitable vent opening 23 to maintain atmospheric pressure above the liquid surface 22.

The water space of the generation chamber 1 is connected through connection 12, line 24, line 26, and line 28 to the interior of tank 14. The line 26 contains a check valve 30 so disposed as to prevent flow of fluid through the line toward the chamber 1 but to permit flow in the opposite direction.

Lines 24 and 28 are connected by a by-pass conduit which connects the chamber 1 to the reservoir 2 independently of check valve 30. This by-pass conduit comprises a line 32, connected to lines 26 and 28 by a T 33, a line 34 and a line 36 connected to lines 24 and 26 by T 37, as shown. Line 32 is provided with a valve which is adapted to be closed when the water level in chamber 1 reaches a predetermined maximum level 38 and to be opened when the water level falls below level 38. As shown, this valve is a float valve 39 of a conventional design having a float chamber 40 containing float 41 and having its upper end, above the float, connected through a line 42 to the vapor space of the chamber 1 and having its lower end, or water space, connected, below the float, through a line 44, and lines 36 and 24, to the water space of the chamber 1. The float chamber 40 is so located vertically as to place the level 38 slightly above the tops of the electrodes 6. The upper and lower ends of chamber 1 thus are in communication through lines 7, 42, float chamber 40, lines 44, 36, 24 and connection 12 so that the water level in the float chamber 40 changes with and remains the same as the water level in chamber 1. These levels remain the same at all pressures of the steam in the vapor space of the chamber.

The float chamber 40 may be provided with a drain line 46 containing a drain cock 48, in the conventional way.

A pressure gauge 50, mounted on a riser 52, may be provided to indicate the steam pressure in the vapor space of chamber 1. A safety valve 54 of conventional design likewise may be provided. The pressure gauge and safety valve in the embodiment shown are connected to and supported by a cross 56 in line 42.

It will be appreciated that the generator may be manufactured for sale and shipment without the riser 8 or the condensate return 10 and with or without the line 28 and reservoir 2 and its associated parts. The reservoir can readily be provided at the place where the unit is to be installed; for example a conventional toilet flush tank can be employed as the reservoir.

When the generator described is to be placed in operation, shut-off valve 18 is first opened to admit water from the water main to the reservoir 2. Water flows from the reservoir 2 into the steam generation chamber 1 through lines 28, 32, valve 39, and lines 34, 36 and 24. It will be understood that a suitable material such as trisodium phosphate will be added to the water within the chamber 1 to render the liquid electrically conducting. The liquid level rises in chamber 1 until it reaches the level 38 whereupon the float 41 is lifted to close valve 39. Thereafter the liquid level rises in line 28 and reservoir 2 until it reaches the level 22, at which point float 20 is lifted to close float valve 18 and shut off the supply of water. Thereupon, liquid flow ceases throughout the system.

It will be appreciated that the procedure just described ordinarily need be followed only when the generator is first placed in operation or when it is started up after the system has been drained, as for cleaning or repair. Normally, when the generator is shut down or temporarily taken out of operation the water will remain in the generation chamber and float chamber to the level 38 and in line 28 and reservoir 2 to level 22.

When the generator, thus properly filled with water, is to be used to supply steam, the switch in the circuit to electrodes 6 is closed. As current flows through the liquid between the electrodes (and between some of the electrodes, the shell 5 and other electrodes) the liquid is heated, eventually producing steam in the vapor space of the shell above the liquid level 38. As the steam pressure rises the water level 38 remains unchanged and the electrodes remain fully immersed to cause maximum current flow, and thereby generation of steam at the maximum rate, until the steam pressure reaches a value which corresponds to the hydrostatic head provided by the liquid in reservoir 14, which is approximately the predetermined desired operating pressure. Thereupon, liquid begins to flow from chambers 1 and 40 through check valve 30 into the reservoir 14, lowering the water level simultaneously in chamber 1 and float chamber 40. When the level in chamber 1 falls below the tops of the electrodes, the immersed area of the electrodes is decreased, decreasing the current flow and thereby the rate at which heat is supplied to the liquid. The decrease in rate of heat supply thus effected will tend to lower the steam pressure and thus lead to the establishment of an equilibrium water level (below the predetermined maximum level 38) at which the pressure applied to the liquid in the water space of the chamber 1 by the hydrostatic head of the liquid in reservoir 2 will just be balanced by the steam pressure which can be maintained in the vapor space of the chamber by the area of the electrodes which is immersed in the liquid.

With variations in the steam demand of the consuming unit 3 there will be fluctuations in the water level in the generation chamber 1. Thus, as the demand increases, the steam pressure will be lowered, permitting the liquid to rise and cover a greater area of the electrodes, thus generating more heat. When the steam demand falls, the steam pressure in the vapor space will rise, forcing liquid from the chambers into the reservoir and thus reducing the immersed area of the electrodes and the rate of heat supplied. The valve 39 is open at all liquid levels in chambers 1 and 40 below the maximum level 38.

When the generator is to be shut down the switch connecting the electrodes to the power supply main is opened and, as the generator cools and the steam in its vapor space is condensed, the water level in chambers 1 and 40 returns to the level 38, thus preparing the generator for heating of the water at its maximum possible rate when it is again started up.

It will be appreciated from the foregoing that the generator of this invention provides in a simple and reliable manner for automatic regulation of the pressure of the steam supplied by the generator. This regulation is continuously and closely responsive to both major variations and minor fluctuations in the demand of the consuming unit to maintain the supplied steam pressure at the desired value within close tolerance limits.

I claim:

1. An electric steam generator comprising a steam generation chamber having a water space adapted to contain a liquid electrolyte and having a vapor space above said water space, an electrode in said water space for heating said electrolyte to generate steam in said chamber, a water supply connection, a conduit connecting the water space of said chamber to said water supply connection, a check valve in said conduit preventing liquid flow through said conduit into said water space, a by-pass conduit connecting said water supply connection to said water space independently of said conduit, a float valve in said by-pass conduit having its float chamber connected above its float to said vapor space and connected below its float to said water space for limiting supply of liquid from said water supply connection to said water space to a predetermined maximum level.

2. An electric steam generator comprising a steam generation chamber having a water space adapted to contain a liquid electrolyte and having a vapor space above said water space, an electrode in said water space for heating said electrolyte to generate steam in said chamber, a liquid reservoir disposed above said chamber, a conduit connecting the water space of said chamber to said reservoir and containing a check valve preventing liquid flow through said conduit into said chamber, a by-pass conduit connecting said reservoir to the water space of said chamber independently of said check valve, a float valve in said by-pass conduit having its float chamber connected above its float to said vapor space and connected below its float to said water space for limiting supply of liquid to said chamber from said reservoir to a predetermined maximum level.

3. An electric steam generator comprising a steam generation chamber having a water space adapted to contain a liquid electrolyte and having a vapor space above said water space, an electrode in said water space for heating said electrolyte to generate steam within said chamber, a liquid reservoir disposed above said chamber, a conduit connecting the water space of said chamber to said reservoir and containing a check valve preventing flow of liquid through said conduit into said chamber, a by-pass conduit connecting said reservoir to the water space of said chamber independently of said check valve, a float valve in said by-pass conduit having its float chamber connected above its float to said vapor space and connected below its float to said water space for limiting supply of liquid to said chamber from said reservoir to a predetermined maximum level, means for supplying liquid to said reservoir and maintaining a liquid level in said reservoir such as to provide a hydrostatic pressure in the liquid in said water space corresponding to the steam pressure desired to be maintained in said vapor space during steaming operation of the generator, and means providing atmospheric pressure on the free surface of the liquid in said reservoir.

4. An electric steam generator comprising a steam generation chamber having a water-space adapted to contain a liquid electrolyte and having a vapor-space above said water-space, a steam outlet connection to said vapor-space, an electrode in said water-space immersed in said electrolyte for heating said electrolyte to generate steam in said chamber, and equipment for varying the level of electrolyte in said water-space in accordance with deviations of the pressure in said vapor-space from a predetermined pressure and correspondingly varying the immersed area of the electrodes to maintain the vapor pressure in said vapor-space substantially equal to said predetermined pressure notwithstanding fluctuations in the rate of steam withdrawal from said steam outlet, comprising a water-supply connection supplying water at a pressure substantially equal to said predetermined pressure, a conduit connecting the water-space of said chamber to said water-supply connection, a check valve in said conduit continuously preventing flow through said conduit into said water-space and continuously providing unrestricted flow through said conduit from said water-space, and means connecting said water-supply connection to the water-space of said chamber independently of said conduit for supplying water to said water-space at said predetermined pressure, up to a predetermined maximum level below said steam outlet connection, whenever the pressure in said vapor-space falls below said predetermined pressure.

5. An electric steam generator comprising a steam generation chamber having a water-space adapted to contain a liquid electrolyte and having a vapor-space above said water-space, a steam outlet connection to said vapor-space, an electrode in said water-space immersed in said electrolyte for heating said electrolyte to generate steam in said chamber, and equipment for varying the level of electrolyte in said water-space in accordance with deviations of the pressure in said vapor-space from a predetermined pressure and correspondingly varying the immersed area of the electrodes to maintain the vapor pressure in said vapor-space substantially equal to said predetermined pressure notwithstanding fluctuations in the rate of steam withdrawal from said steam outlet, comprising a water-supply connection supplying water at a pressure substantially equal to said predetermined pressure, a conduit connecting the water-space of said chamber to said water-supply connection, a check valve in said conduit continuously preventing flow through said conduit into said water-space and continuously providing unrestricted flow through said conduit from said water-space, a by-pass conduit connecting said water-supply connection to the water-space of said chamber independently of said conduit for supplying water to said water-space at said predetermined pressure whenever the pressure in said vapor-space falls below said predetermined pressure, a valve in said by-pass conduit and means for closing said valve when the liquid level in said chamber reaches a predetermined maximum level below said steam outlet connection.

6. An electric steam generator comprising a steam generation chamber having a water-space adapted to contain a liquid electrolyte and having a vapor-space above said water-space, a steam outlet connection to said vapor-space, an electrode in said water-space immersed in said electrolyte for heating said electrolyte to generate steam in said chamber, and equipment for varying the level of electrolyte in said water-space in accordance with deviations of the pressure in said vapor-space from a predetermined pressure and correspondingly varying the immersed area of the electrodes to maintain the vapor pressure in said vapor-space substantially equal to said predetermined pressure notwithstanding fluctuations in the rate of steam withdrawal from said steam outlet, comprising a reservoir disposed above said chamber at an elevation to supply water at a pressure substantially equal to said predetermined pressure, a conduit connecting the water-space of said chamber to said reservoir, a check valve in said conduit continuously preventing flow through said conduit into said water-space and continuously providing unrestricted flow through said conduit from said water-space, and means connecting said reservoir to the water-space of said chamber independently of said conduit for supplying water to said water-space at said predetermined pressure, up to a predetermined maximum level below said steam outlet connection, whenever the pressure in said vapor-space falls below said predetermined pressure.

7. An electric steam generator comprising a steam generation chamber having a water-space adapted to contain a liquid electrolyte and having a vapor-space above said water-space, a steam outlet connection to said vapor-space, an electrode in said water-space immersed in said electrolyte for heating said electrolyte to generate steam in said chamber, and equipment for varying the level of electrolyte in said water-space in accordance with deviations of the pressure in said vapor-space from a predetermined pressure and correspondingly varying the immersed area of the electrodes to maintain the vapor pressure in said vapor-space substantially equal to said predetermined pressure notwithstanding fluctuations in the rate of steam withdrawal from said steam outlet, comprising a water-supply connnection supplying water at a pressure substantially equal to said predetermined pressure, a conduit connecting the water-space of said chamber to said water-supply connection, a check valve in said conduit continuously preventing flow through said conduit into said water-space and continuously providing unrestricted flow through said conduit from said water-space, a by-pass conduit connecting said water-supply connection to the water-space of said chamber independently of said conduit for supplying water to said water-space at said predetermined pressure whenever the pressure in said vapor-space falls below said predetermined pressure, and a float valve in said by-pass conduit having its float chamber connected above its float to said vapor-space and connected below its float to said water-space for limiting supply of water from said water-supply connection to said water-space to a predetermined maximum level below said steam outlet connection.

8. An electric steam generator comprising a steam generation chamber having a water-space adapted to contain a liquid electrolyte and having a vapor-space above said water-space, a steam outlet connection to said vapor-space, an electrode in said water-space immersed in said electrolyte for heating said electrolyte to generate steam in said chamber, and equipment for varying the level of electrolyte in said water-space in accordance with deviations of the pressure in said vapor-space from a predetermined pressur and correspondingly varying the immersed area of the electrodes to maintain the vapor pressure in said vapor-space substantially equal to said predetermined pressure notwithstanding fluctuations in the rate of steam withdrawal from said steam outlet, comprising a reservoir disposed above said chamber at an elevation to supply water at a pressure substantially equal to said predetermined pressure, a conduit connecting the water-space of said chamber to said reservoir, a check valve in said conduit continuously preventing flow through said conduit into said water-space and continuously providing unrestricted flow through said conduit from said water-space, a by-pass conduit connecting said reservoir to the water-space of said chamber independently of said conduit for supplying water to said water-space at said predetermined pressure whenever the pressure in said vapor-space falls below said predetermined pressure, and a float valve in said by-pass conduit having its float chamber connected above its float to said vapor-space and connected below its float to said water-space for said vapor-space from a predetermined pressure limiting supply of water from said reservoir to said water-space to a predetermined maximum level below said steam outlet connection.

STANLEY LIVINGSTONE.

REFERENCES CITED

The following references are of record in the file of this patent:

UNITED STATES PATENTS

| Number | Name | Date |
|---|---|---|
| Re. 16,935 | Noll | Apr. 17, 1928 |
| 1,522,474 | Horstkotte | Jan. 6, 1925 |
| 2,185,786 | Eaton | Jan. 2, 1940 |

Certificate of Correction

Patent No. 2,538,648 January 16, 1951

STANLEY LIVINGSTONE

It is hereby certified that error appears in the printed specification of the above numbered patent requiring correction as follows:

Column 8, line 54, strike out the words "said vapor-space from a predetermined pressure";

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*